May 10, 1966 E. A. PORTER 3,250,994

COMPENSATED T FOR RADIO FREQUENCY VOLTMETER

Filed Oct. 21, 1963

United States Patent Office 3,250,994
Patented May 10, 1966

3,250,994
COMPENSATED T FOR RADIO FREQUENCY VOLTMETER

Ernest A. Porter, Boonton, N.J.
(10 Windsor Road, Morris Plains, N.J.)

Filed Oct. 21, 1963, Ser. No. 317,554
2 Claims. (Cl. 324—95)

This invention relates to T connections employed with co-axial transmission lines and more particularly to a novel compensated T connection to a probe for an RF voltmeter.

The T connections of the prior art have a useful range up to about 1,000 megacycles.

This invention extends the upper frequency limit of operation of a sensitive RF voltmeter above 2,000 megacycles.

The connection of a monitoring voltmeter in a transmission line is conventionally effected by a tapping device known as a T. However, such devices introduce discontinuities in the transmission line, and thus produce a mismatch.

In the conventional T connector the interior is hollowed out to present a large cavity in order to reduce the capacitance between the shell of the T and the center conductor therein. This reduction of capacitance is done with the aim of compensating for the relatively large input capacitance of the probe connected to the hollowed out T.

The conventional T is limited by an increasing voltage standing wave ratio (VSWR) to a top frequency of about 1,000 megacycles.

An important feature of this invention is the matching of the characteristic impedance of the input line, for example, 50 ohms, at the sensing point engaging the probe, by a summed impedance of the two arms connected to said sensing point on the output side thereof, said summed impedance being equivalent to a resistive load matching the characteristic impedance of the input line as set forth in EDN (Electrical Design News) November, 1963, pages 19 to 23.

This procedure permits good line matching to frequencies exceeding 2,000 megacycles.

According to this invention the predominantly capacitive effect of the probe is compensated by an inductive effect produced by a suitable inductive element disposed in the line between the sensing point and the termination.

By way of contrast the prior art hollowed-out T device introduces a discontinuity before reaching the sensing point. Clearly, the section of the T located before the sensing point, i.e. the input side, can be looked upon as an inductance in series with the capacitance of the probe. Such an inductance-capacitance combination functions as a low-pass filter and at resonance will short circuit the input thereby limiting the useful top operating frequency to about 1,000 megacycles.

It is an object of this invention to provide a novel T construction, a compensated T construction having an inductive effect within the output section of the T to counter-balance the capacitive effect introduced by the probe.

It is another object to extend the range of testing above 2,000 megacycles.

It is another object to provide a compensated T having a matched line to the junction or sensing point.

These and other objects of this invention will become apparent on reading the following descriptive disclosure of an illustrative embodiment taken in connection with the accompanying drawing in which.

Figures 1, 2:
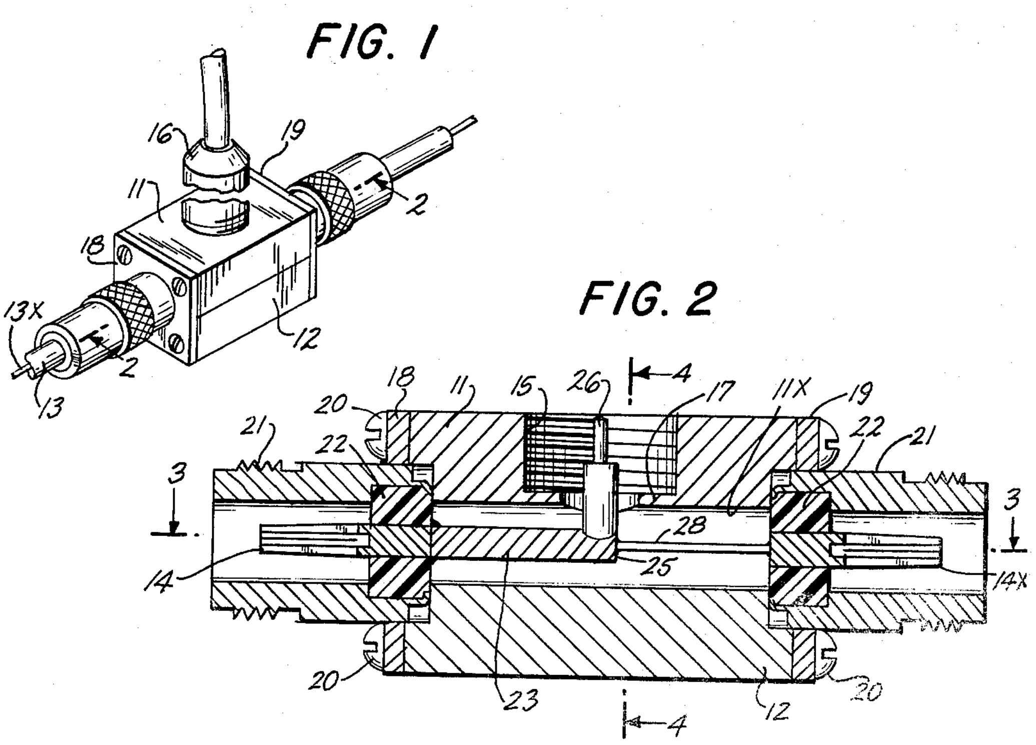
FIG. 1 is a perspective view of the compensated T showing the probe broken away in part.
FIG. 2 is a section view taken on line 2—2 of FIG. 1 and showing the continuation of the input wire to the center of the T where it engages the probe contact pin and showing further the cylindrical air cavity surrounding this line throughout the longitudinal dimension of the T.
Figure 3:
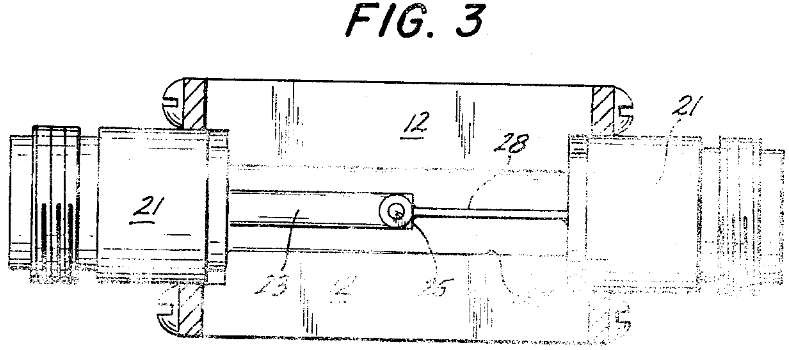
FIG. 3 is a top plan view of the T with the upper section of the rectangular T assembly removed.

Turning to the drawing, the compensated T of this invention is provided with a longitudinal body 10 consisting of a top half section 11 and a bottom half section 12.

The interior surface of section 11 is provided with a semi-cylindrical channel 11X of suitable critical diameter to maintain, for example, the 50 ohm characteristic impedance of the input co-axial cable 13 with its center lead wire 13X (FIG. 2).

Similarly the bottom half section 12 is provided with a co-acting semi-cylindrical channel 12X of like critical diameter and disposed under the channel 11X to form a longitudinal cylindrical cavity extending through the body 10 substantially from one end to the other. In the case of an integral body, the cylindrical cavity may be a cylindrical bore hole.

The top half section 11 is provided with a suitably located threaded aperture 15 to receive a probe 16 leading to a voltmeter (not shown).

The threaded aperture 15 extends a suitable and critical distance into the top section 11 terminating at a ledge 17 which functions as the inner seat for probe 16 limiting its inward movement.

As shown in FIG. 1, the ends of the compensated T of this invention are provided with flat end plates 18 and 19, said end plates being secured to said half sections 11 and 12 by suitable bolts 20 disposed in suitable threaded cavities disposed in the end surfaces of said half sections 11 and 12.

The end plates 18 and 19 are each suitably soldered to conventional threaded connectors 21 having plastic insulator spacer discs 22 therein. Each connector 21 is provided with a suitable conventional split connector-pin 14 on the input side and 14X on the output side.

As shown in FIG. 2, the input connector pin 14 is suitably soldered to a longitudinal wire 23. The wire 23 is disposed concentrically in the center of the longitudinal cylindrical cavity and extends interiorly in this cavity to substantially the center of the body 10.

The diameter of wire 23 and the diameter of said cylindrical bore hole or cavity are suitably proportioned to maintain said 50 ohm characteristic impedance of the input cable to the center of the T.

Preferably the pin 14 and wire 23 are of integral or one-piece construction.

In any event the diameter of wire 23 is surrounded by an annular dielectric, e.g. air space of suitable width to maintain the characteristic impedance of cable 13 within the body 10 up to the terminus 25 of wire 23.

Figure 4:
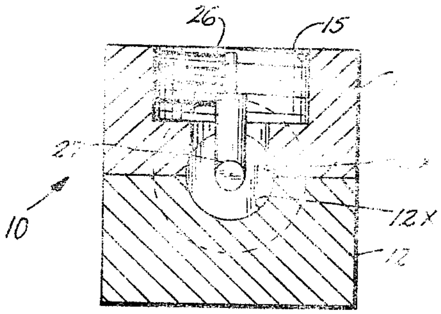
FIG. 4 is a section view taken on line 4—4 of FIG. 2 showing the manner of mating the top and bottom halves of the compensated T.

A contact stud pin 26 of suitable dimensions is provided with a curved saddle surface 27 (FIG. 4) and is suitably soldered at a right angle to wire 23, said pin 26 extending suitably and centrally into the threaded aperture 15 of the top half section 11 to suitably engage the co-acting probe 16.

The pin 26 may be variously connected to the wire 23 as by any conventional practice, the use of a soldered saddle being but one method of effecting a firm engagement of the two elements.

A critical feature of this invention is the provision of a wire 28 of critical diameter, disposed centrally and concentrically in the cylindrical cavity between the half-sections 11 and 12 and soldered suitably to the terminus 25 of wire 23 and to the free end of connection pin 14X.

This relatively thin wire 28 functions as an inductance connected to the load at pin 14X thereby compensating for the capacitance introduced unavoidably by the use of the probe 16.

Thus an inductive coupling of wire 28 to the load is made.

The compensation effect of the compensated T of this invention has been made effective to above 2,000 megacycles, thereby greatly increasing the frequency range that can now be measured by millivoltmeters.

The over-all effect of this invention is that the characteristic impedance of the transmission line on the input side is extended to the center of the T, and the capacitive effect of the detector or probe 16 is compensated on the output side of the sensing point by an inductive stub. This procedure reduces the equivalent circuit of the T to a single mesh, which is adjusted to maintain a load at the sensing point that matches the transmission line characteristic impedance to above 2,000 megacycles and is parallel-resonant at some point beyond that frequency.

This invention has been described by means of an illustration. But it is not to be limited to this illustration as it is of a broad or generic scope.

Thus the T body may be modified to assume a Y-shaped body or any of a number of physical shapes. Moreover, the impedance may be a numerical order higher or lower than the 50 ohms used for illustrative purposes.

The body portion 10 may be of one-piece or integral construction having suitable bore holes therein.

All such obvious modifications as will present themselves to those skilled in the art are intended to be covered by the claims herein.

What is claimed is:

1. A compensated T for measuring voltage by insertion in a co-axial transmission line and used as part of a system consisting of the T, an RF detector probe having significant resistance and a D.C. voltmeter, comprising a longitudinal body having a bore-hole therethrough and a suitably disposed probe receiving aperture disposed at an angle to said bore-hole, a longitudinal integral conductor means of plural diameter sections disposed concentrically in said bore-hole, said conductor means having an angularly disposed probe engaging portion disposed centrally in said probe receiving aperture, said conductor means having the section between the input and the center of said probe receiving aperture being preselected of such larger diameter as to make the characteristic impedance of that section equal to that of the associated transmission line, said conductor means having the lesser diameter portion disposed between the probe engaging device and the output end, and insulator holder means disposed about each end of said longitudinal conductor means whereby the lesser diameter conductor portion functions inductively to compensate for the capacitive and resistive effects of said associated RF probe and D.C. voltmeter.

2. The compensated T of claim 1 wherein said body consists of two half pieces held together by a pair of apertured end pieces adapted to receive said holder means.

References Cited by the Examiner

UNITED STATES PATENTS 2,446,982 8/1948 Pound ---------------- 178—44

OTHER REFERENCES

Pages 53–92, 1947: Radio Research Laboratory, Harvard University, "Very High Frequency Techniques." N.Y., McGraw-Hill, TK 6553 U65. (Chapter 3, volume 1.)

Page 520, 1948: Ragan, G. L., "Microwave Transmissions Circuits." N.Y., McGraw-Hill, TK 6553 R34.

HERMAN KARL SAALBACH, *Primary Examiner.*

R. D. COHN, *Assistant Examiner.*